US 6,691,918 B1

(12) United States Patent
Yoda et al.

(10) Patent No.: US 6,691,918 B1
(45) Date of Patent: Feb. 17, 2004

(54) IMAGE READING SYSTEM FOR READING IMAGE BASED ON VARIOUS PARAMETERS (75) Inventors: Nobuhisa Yoda, Kamakura (JP);
Hiroyuki Kato, Ichikawa (JP);
Kazuhiro Ogura, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 293 days.

(21) Appl. No.: 09/653,891

(22) Filed: Sep. 1, 2000

(30) Foreign Application Priority Data

Sep. 2, 1999 (JP) .......................................... 11-249185

(51) Int. Cl.7 ................................................ G06K 7/10
(52) U.S. Cl. ...................................... 235/454; 235/436
(58) Field of Search ............................... 235/454, 383, 235/435, 436, 459

(56) References Cited

U.S. PATENT DOCUMENTS

| 3,711,683 A | * | 1/1973 | Hamisch, Sr. ............... 235/487 |
| 5,506,696 A | * | 4/1996 | Nakano ....................... 358/504 |
| 5,796,435 A | * | 8/1998 | Nonomura et al. .... 375/240.03 |
| 5,805,779 A | * | 9/1998 | Christopher et al. ........ 358/1.13 |
| 6,009,153 A | * | 12/1999 | Houghton et al. ...... 379/100.01 |
| 6,031,621 A | * | 2/2000 | Binder ........................ 235/383 |
| 6,151,674 A | * | 11/2000 | Takatani ..................... 709/222 |
| 6,253,219 B1 | * | 6/2001 | Gardner et al. ............. 705/401 |
| 6,289,371 B1 | * | 9/2001 | Kumpf et al. .............. 709/203 |
| 2001/0055492 A1 | * | 12/2001 | Wood et al. ................... 399/8 |

FOREIGN PATENT DOCUMENTS

| JP | 01-135037 | * | 5/1989 |
| JP | 10-269219 | * | 10/1998 |
| JP | 11-331446 | * | 11/1999 |
| JP | 2000-032203 | * | 1/2000 |

* cited by examiner

Primary Examiner—Thien M. Le
Assistant Examiner—Uyen Chau N Le
(74) Attorney, Agent, or Firm—Foley & Lardner (57) ABSTRACT An image reading system includes an image reading device and a terminal device which are connected via a network. The image reading device includes a setting unit for setting parameters, a first storage unit for storing a series of parameters set by the setting unit as one template, and an image reader for reading an image on the basis of the parameters set in the template. The terminal device includes a second storage unit for storing the template stored in the first storage unit.

14 Claims, 10 Drawing Sheets

| TEMPLATE NAME | RESOLUTION | MODE | DENSITY | DISTRIBUTION CLASSIFICATION | DESTINATION |
|---|---|---|---|---|---|
| E-MAIL TO MR. XX | 200 | CHARACTER | AUTOMATIC | E-MAIL | XX@yyy.co.jp |
| REGISTRATION TO BULLETIN BOARD | 200 | CHARACTER | AUTOMATIC | GROUP | CATEGORY: BULLETIN BOARD |
| DESIGN DRAWING (PC MANUFACTURE) | 600 | CHARACTER | AUTOMATIC | FILE | ¥¥Server¥Fig¥PC |
| ... | | | | | |

FIG. 4

SELECT TEMPLATE

| | | | | | | |
|---|---|---|---|---|---|---|
| NAME | REGISTRATION TO BULLETIN BOARD | | | | | EDIT |
| RESOLUTION | 100 | 200 | 300 | 400 | 600 | |
| MODE | CHARACTER | STANDARD | PHOTOGRAPH | | | |
| DENSITY | AUTOMATIC | HIGH | MEDIUM | LOW | | |
| DISTRIBUTION CLASSIFICATION | E-MAIL | GROUPWARE | FILE SERVER | | | |
| DESTINATION | CATEGORY | | | | | EDIT |
| CANCEL | | | | | UNDO | REGISTER |

FIG. 5

REGISTRATION TO BULLETIN BOARD ⇦ ⇨

| あ | ん | わ | ら | や | ま | は | な | た | さ | か | あ |
|---|---|---|---|---|---|---|---|---|---|---|---|
| い | っ | を | り | | み | ひ | に | ち | し | き | い |
| う | ゛ | ゃ | る | ゆ | む | ふ | ぬ | つ | す | く | う |
| え | ゜ | ゅ | れ | | め | へ | ね | て | せ | け | え |
| お | っ | ょ | ろ | よ | も | ほ | の | と | そ | こ | お |

あ / ア / A / a

| CONVERSION | NO CONVERSION | CHECK | OK | CANCEL |

```
URL http://network-scanner01/backup.html
```

TEMPLATE RESTORE
CONTENTS OF BACKUP FILE ARE AS FOLLOWS.

| SCANNER NAME | network-scanner.01 |
| --- | --- |
| BACKUP DATE AND TIME | 11:30, 8/25/1999 |

CHECK TEMPLATE TO BE RESTORED AND PRESS RESTORE KEY.

| | TEMPLATE NAME |
| --- | --- |
| ☐ | E-MAIL TO MR. XX |
| ☐ | REGISTRATION TO BULLETIN BOARD |
| ☐ | DESIGN DRAWING (PC MANUFACTURE) |
| ☐ | ... |
| ☐ | |

[RESTORE CHECKED TEMPLATE(S)]　　[RESTORE ALL TEMPLATES]

FIG. 14

```
URL http://network-scanner01/backup.html
```

TEMPLATE RESTORE

RESTORE IS COMPLETE.

TEMPLATE SETTING SHEET

SELECT "TEMPLATE READ" IN SELECTING FUNCTIONS OF DIGITAL COPYING MACHINE AND READ SELECTED TEMPLATE. TEMPLATE SETTINGS ARE AUTOMATICALLY SET.

OUTLINE OF TEMPLATE

| TEMPLATE NAME | REGISTRATION TO BULLETIN BOARD |
|---|---|
| READ PARAMETERS | 600dpi, CHARACTER MODE, AUTOMATIC DENSITY CONTROL |
| DISTRIBUTOR | GroupWare |

DO NOT SOIL BAR CODES BECAUSE THEY ARE MECHANICALLY READ.

FIG. 17

IMAGE READING SYSTEM FOR READING IMAGE BASED ON VARIOUS PARAMETERS

CROSS-REFERENCE TO RELATED APPLICATIONS

This application is based upon and claims the benefit of priority from the prior Japanese Patent Application No. 11-249185, filed Sep. 2, 1999, the entire contents of which are incorporated herein by reference.

BACKGROUND OF THE INVENTION

In recent years, a network scanner system has been popular, which arranges a scanner on a network and transmits image data read by the scanner to a network terminal. In such a network scanner system, various parameters must be set. A parameter for designating a distribution destination for realizing a network distribution function must be set in addition to setting of parameters for designating a resolution and the like. The network distribution function is a function of automatically distributing image data read by the scanner to a distribution destination set in advance.

As described above, very many parameters must be set in the network scanner system. It is very inefficient to set these many parameters every time an image is scanned.

BRIEF SUMMARY OF THE INVENTION

It is an object of the present invention to solve the conventional problem described above and provide the following image reading system.

The image reading system is an image reading system capable of reusing parameters set in the past and preventing any loss of the parameters set in the past.

In order to achieve the above object, there is provided an image reading system having an mage reading device and a terminal device which are connected via a network, the image reading device comprising a setting unit for setting parameters, a first storage unit for storing a series of parameters set by the setting unit as one template, and an image reader for reading an image on the basis of the parameters set in the template.

The terminal device comprises a second storage unit for storing the template stored in the first storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment of the present invention will be described below with reference to the accompanying drawing.

Figure 1:
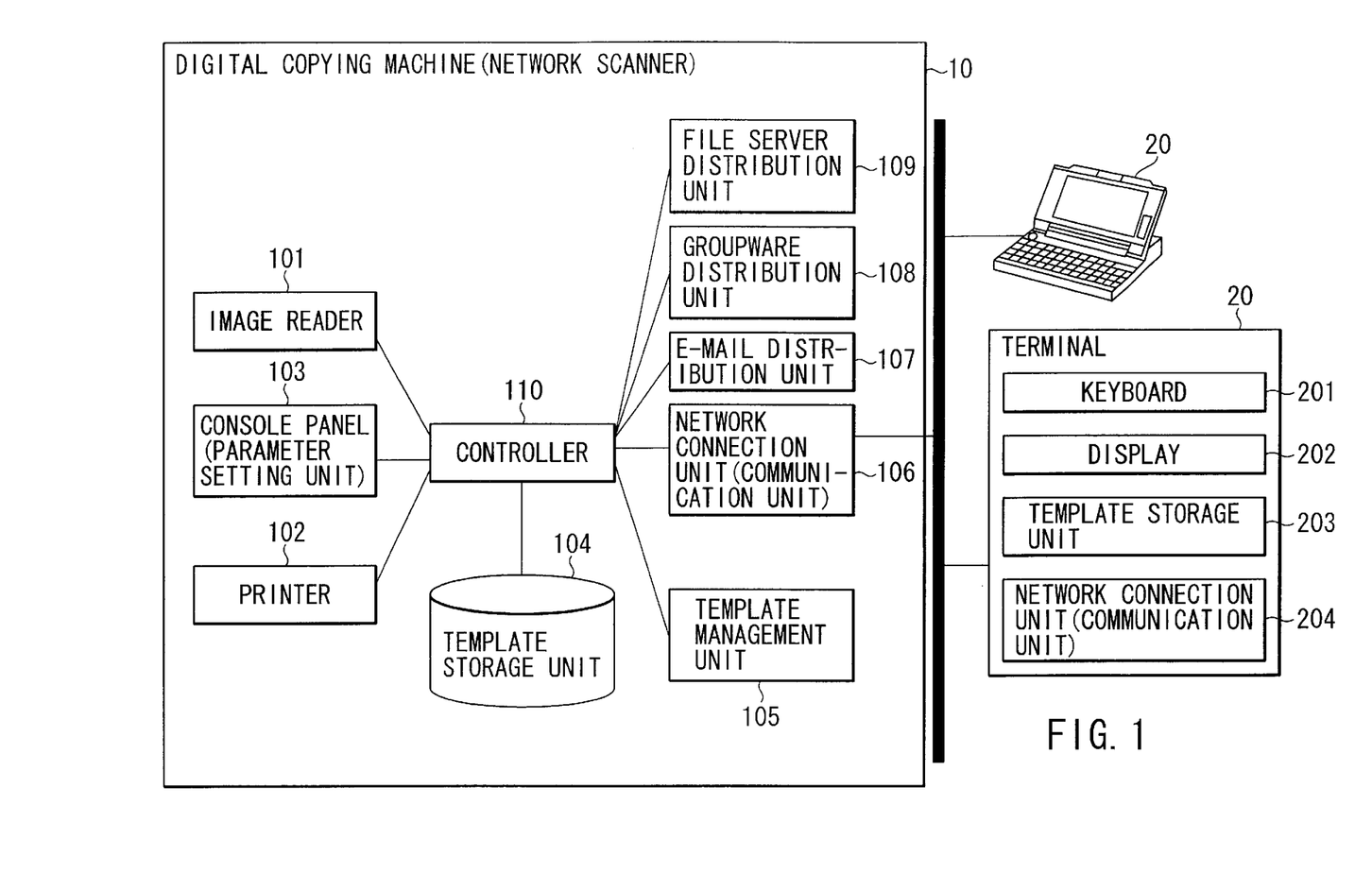
FIG. 1 is a block diagram showing an arrangement of an image reading system according to the present invention.

FIG. 1 is a view showing an arrangement of an image reading system according to the present invention.

As shown in FIG. 1, the system is comprised of a digital copying machine 10 and a plurality of terminals 20. The digital copying machine and each terminal 20 are connected via a network.

The digital copying machine 10 is comprised of an image reader 101, printer 102, console panel 103, template storage unit 104, template management unit 105, network connection unit 106, E-mail distribution unit 107, groupware distribution unit 108, file server distribution unit 109, and controller 110.

Figure 17:
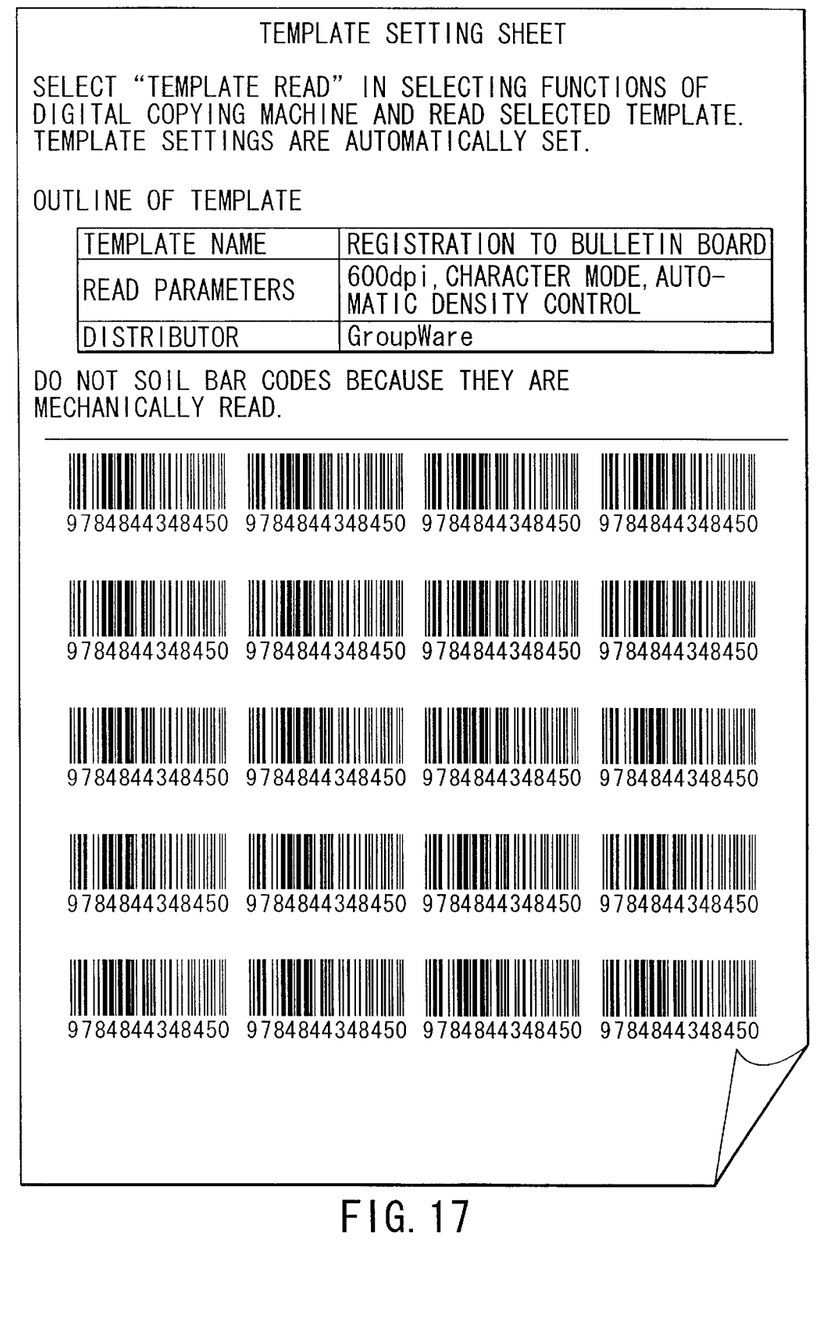
FIG. 17 is a view showing a template setting sheet.

The image reader 101 reads an original image and provides image data corresponding to this original image to the respective units. The printer 102 prints out an image based on the image data and a template setting sheet. FIG. 17 is a view showing a template setting sheet. This template setting sheet will be described in detail later. The console panel 103 receives various instructions from users and notifies the users of various guide messages. The console panel 103 receives settings of various parameters (to be described later).

The template storage unit 104 stores a series of parameters set by the console panel 103 as one template. The template management unit 105 manages the template. More specifically, the template management unit 105 backs up and restores the template and creates a template setting sheet. The network connection unit 106 connects the digital copying machine 10 to the network. This allows the digital copying machine 10 to transmit a template to the terminal 20 or receive a template transmitted from the terminal 20.

The E-main distribution unit 107 attaches to E-mail image data provided from the image reader 101 on the basis of the settings by the network distribution function. The groupware distribution unit 108 distributes to groupware image data provided from the image reader 101 on the basis of the settings of the network distribution function. The file server distribution unit 109 distributes to a file server image data provided from the image reader 101 on the basis of the network distribution function. These distribution units are called a distribution as a whole. The controller 11 controls the whole digital copying machine.

The terminal 20 is comprised of a keyboard 201, display 202, template storage unit 203, and network connection unit 204.

The keyboard 201 receives various inputs from the user. The display 202 displays various kinds of information to the user. The network connection unit 204 connects the terminal 20 to the network. This allows the terminal 20 to receive a template transmitted from the digital copying machine 10 (template download) or transmit a template to the digital copying machine 10 (template upload). The template storage unit 203 stores the template transmitted via the network.

Figure 2:
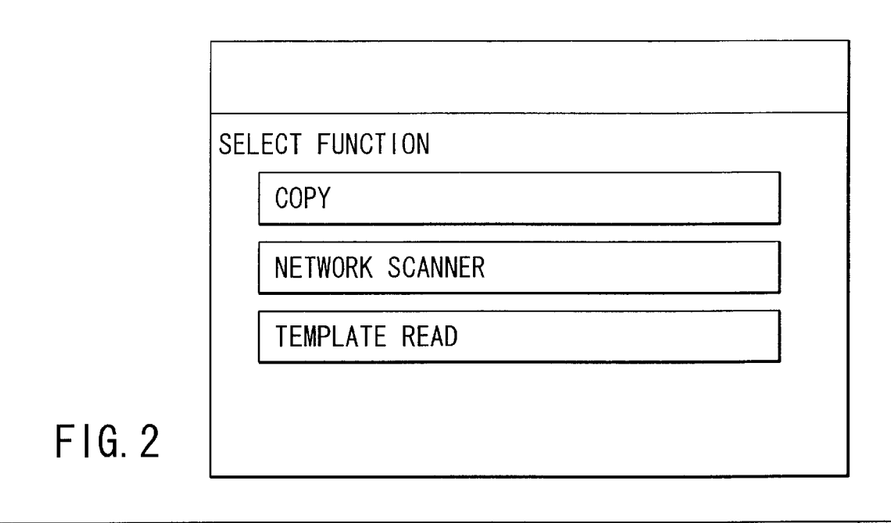
FIG. 2 is a view showing an initial window displayed on a console panel when a digital copying machine is activated.

FIG. 2 is a view showing an initial window displayed on the console panel 103 when the digital copying machine 10 is activated. The console panel 103 is used as a touch panel in this case. When the user touches a displayed item, the touched item is selected and input.

When the user touches an item "copy" in the initial window, this copying machine 10 serves as a copying machine. When the user touches an item "network scanner" in the initial window, the digital copying machine 10 serves as a network scanner. When the user touches an item "template read" in the initial window, the digital copying machine 10 serves as a bar code reader. The functions of the network scanner and bar code reader will be described later in detail.

The digital copying machine 10 serving as a network scanner will be described below. When the user touches the item "network scanner" in the initial window displayed on the console panel 103, the window changes to a template list window shown in FIG. 4.

A list of a plurality of templates is displayed in this template list window. More specifically, a list of names (template names) assigned to the respective templates is displayed. In the template list window shown in FIG. 4, a list of template names such as "E-mail to Mr. xx", "registration to bulletin board", and "drawing management (PC manufacture)" as the registered templates is displayed. A list of template names such as "template registration 4", "template registration 5", and "template registration 6" as unregistered templates is also displayed.

Figure 4:
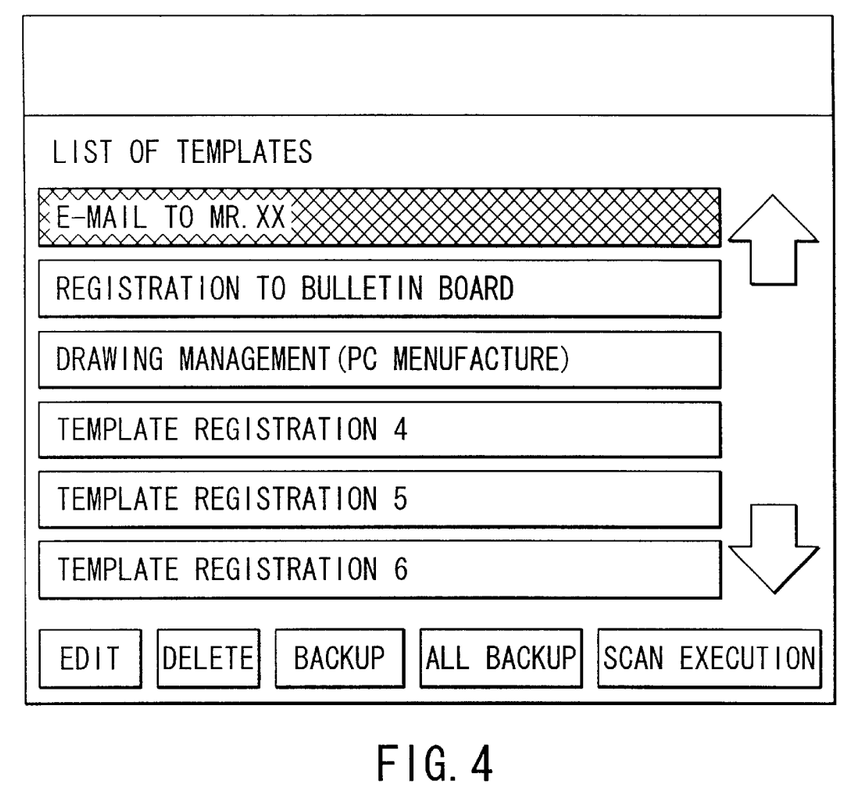
FIG. 4 is a view showing a template list window.

Up and down arrow bars are displayed on the right end of the template list window to vertically scroll the window contents. The user touches the up or down arrow bar to vertically move the window contents to check template names not displayed in the window.

An edit key, delete key, backup key, all backup key, and scan execution key are displayed at the bottom of the template list window. When the user touches a template name item and then the edit key, the template registered by the touched and selected template name can be edited. With this operation, a registered template can be re-edited, or an unregistered template can be edited. Re-editing the registered template means changing a parameter set in the registered template. Editing the unregistered template means simply registering a new template.

When the user touches a template name item and then the delete key, the template registered by the touched and selected template name is deleted. When the user touches a template name item and then the backup key, the template registered by the touched and selected template name is backed up. When the user touches the all backup key, all the registered templates are backed up. These backup operations will be described later in detail.

When the user touches a template name item and then the scan execution key, an image is read in accordance with the parameters set in the template registered by the touched and selected template name, and the network distribution function is performed. Note that only image read is performed unless a parameter about the network distribution function is set.

Figure 5:
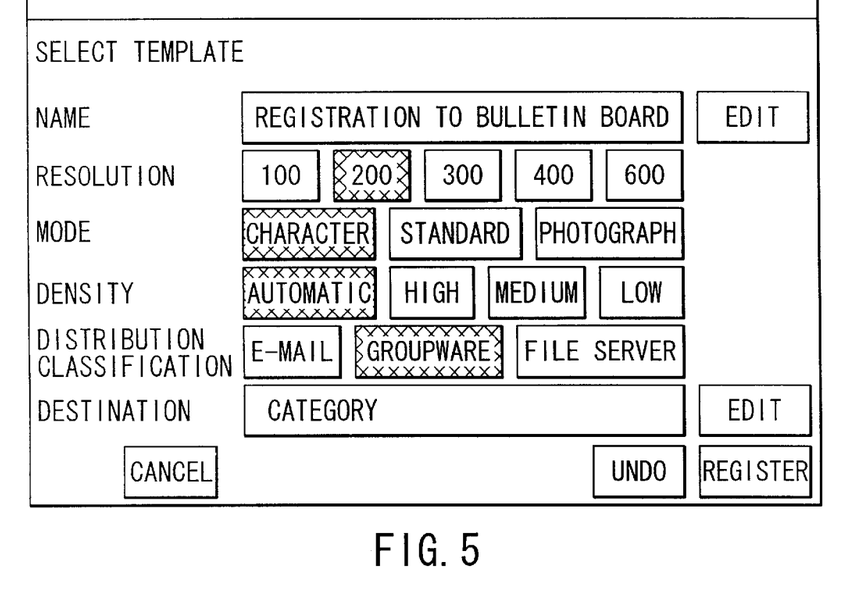
FIG. 5 is a view showing a parameter edit window.

The template edit operation (re-edit and new registration) will be described below. As described above, when the user touches a template name item and then the edit key, the parameter edit window for the template registered by the touched and selected template name is displayed. FIG. 5 is a view showing the parameter edit window. Items such as the name, resolution, mode, density, distribution classification, destination, and registration are displayed in the parameter edit window.

An arbitrary name may be input for the name item. An input name is used as a template name. For example, "registration to bulletin board" is input for the name item of the parameter edit window shown in FIG. 5.

Items such as 100 dpi, 200 dpi, 300 dpi, and 400 dpi are displayed as the resolution items. When these items are displayed, the user can touch and designate a desired resolution. Items such as a character mode, standard mode, and photograph mode are displayed as the mode items. When these items are displayed, the user can touch and designate a desired mode. Items such as automatic, high, medium, and low are displayed as density items. When these items are displayed, the user can touch and designate a desired density. Items such as E-mail, groupware, and file server are displayed as distribution classification items. When these items are displayed, the user can touch and designate a desired distribution classification item. The touched item is inverted and displayed, as shown in FIG. 5. To perform the network distribution function, a desired distribution destination must be designated with the distribution classification item. When the distribution classification is E-mail, an E-mail address is input as the destination item. When the distribution classification is groupware, a category (e.g., a bulletin board) is input as the destination item. When the distribution classification is a file server, a data storage destination address is input as the destination item.

Figure 6:
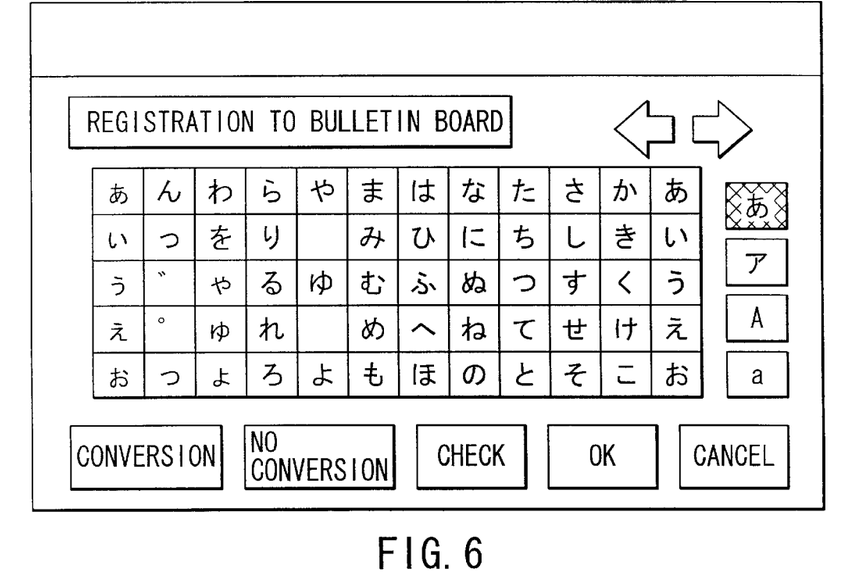
FIG. 6 is a view showing a keyboard window.

Operation for inputting a name and destination will be described in more detail. The edit keys are prepared at the right ends of the name and destination items, respectively. When the user touches one of these edit keys, a software keyboard shown in FIG. 6 is displayed. The user can touch to input the name and destination.

Figure 3:
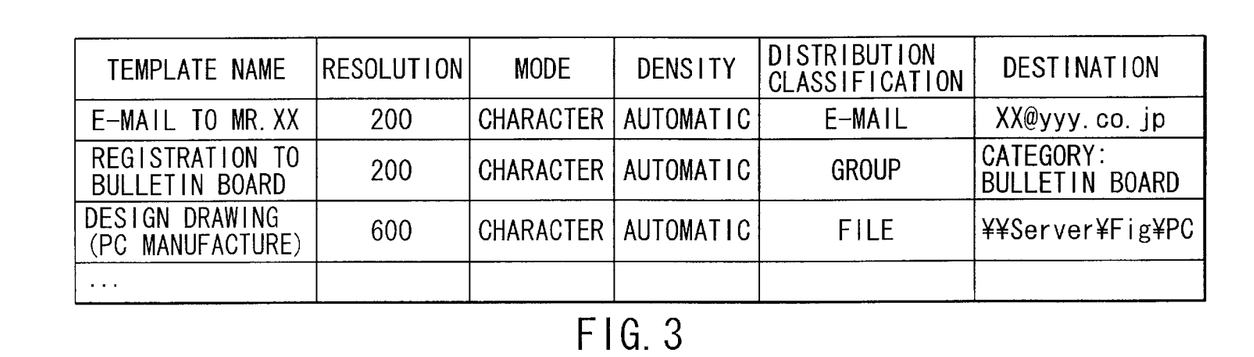
FIG. 3 is a view showing data of a template stored in a template storage unit.

Assume that a name is input, that a desired resolution, mode, and density are designated, that a distribution classification is designated, as needed, that a destination is input, and then the registration item is touched. In this case, the set parameters are registered as a template. The registration destination is the template storage unit 104. FIG. 3 is a schematic view showing data of templates stored in the template storage unit 103. Each template contains data representing a template name, resolution, mode, density, distribution classification, destination, and the like.

Figure 7:
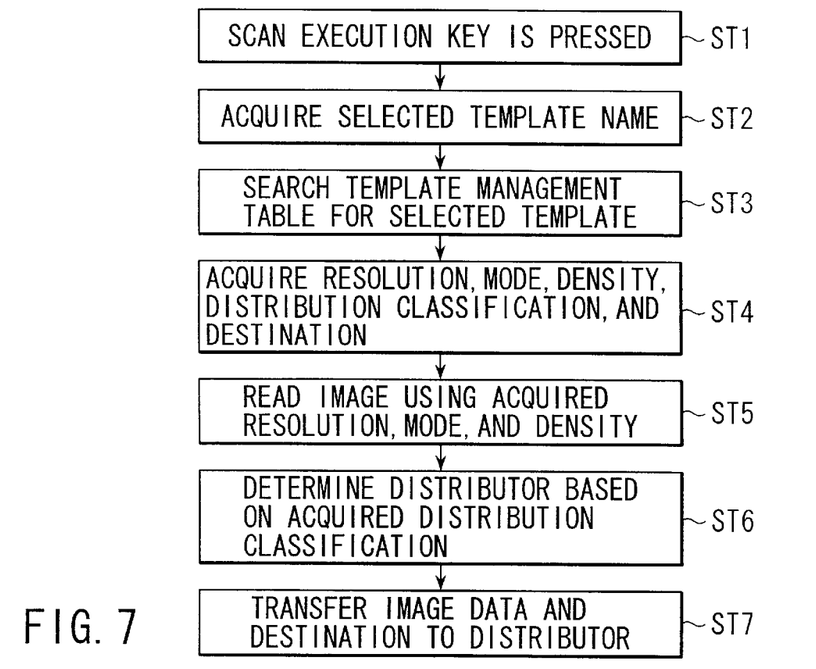
FIG. 7 is a flow chart for explaining the flow until the network distribution function is performed upon execution of scan operation.

The flow until the network distribution function is performed upon execution of scan operation will be described with reference to FIG. 7. Operation starts from the template list window shown in FIG. 4. When the user touches a template name item and then the scan execution key which are displayed on the template list window (ST1), the touched template name is acquired (ST2). The template management unit 105 searches the template storage unit 104 for a target template name (ST3) to obtain a resolution, mode, density, distribution classification, destination, and the like (ST4). The image reader 101 reads an original image on the basis of the acquired resolution, mode, density, and the like to acquire image data corresponding to this original image (ST5). The controller 111 determines a distributor on the basis of the acquired distribution classification (ST6). More specifically, the controller 111 determines one of the E-mail distribution unit 107, groupware distribution unit 108, and file server distribution unit 109 on the basis of the acquired distribution classification. The acquired image data and distribution are provided to the determined distributor (ST7). The distribution unit distributes image data to the target destination.

Figure 8:
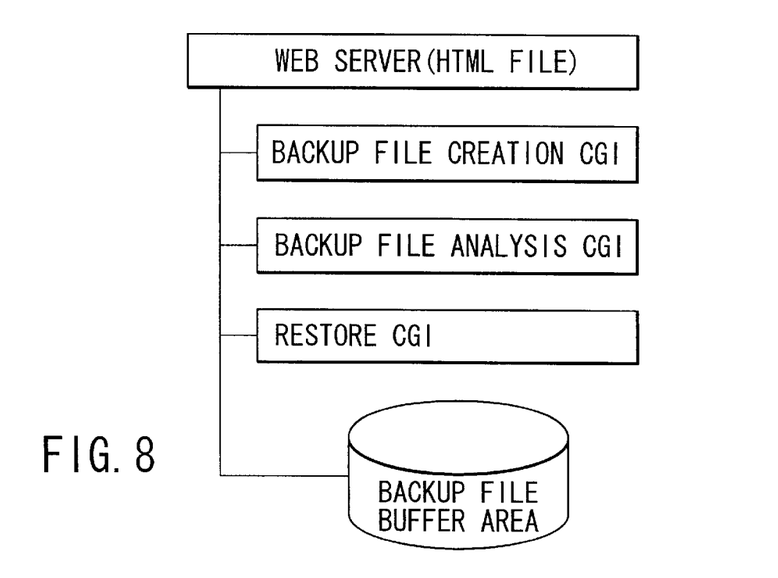
FIG. 8 is a view for explaining backup and restore operations of a template by a template management unit.

FIG. 8 is a view showing the structure of the template management unit. As shown in FIG. 8, the template management unit is comprised of a Web server (html files), backup file creation CGI module, backup file analysis CGI module, restore CGI module, and backup file buffer area. The Web server displays a page on a browser. The backup file creation CGI module creates a backup file. The backup file analysis CGI module extracts a list of templates from the backup file and creates pages from which the user can select. The restore CGI module restores a template. The backup file buffer area temporarily stores a backup file.

Figure 9:
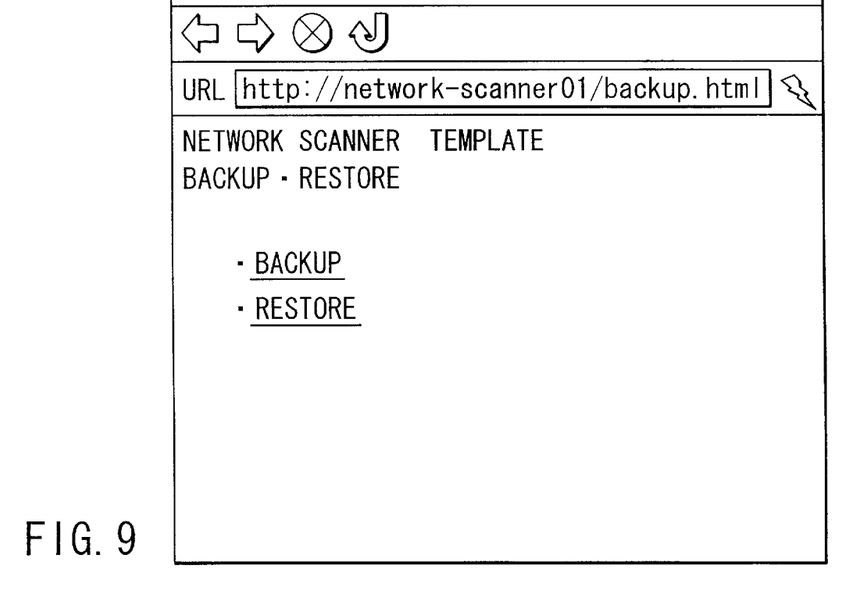
FIG. 9 is a view showing a main page displayed at a terminal when the terminal is connected to a digital copying machine (network scanner)

FIG. 9 is a view showing a main page displayed on the display 202 of the terminal 20 when the terminal 20 is connected to the network scanner (digital copying machine 10) using the browser. As shown in FIG. 9, a backup link and restore link are displayed in the main page. When the user wants to back up a template (i.e., when the user wants to download a template), the user clicks the backup link with a mouse. Clicking activates a template list CGI and displays a template list window for backup candidates shown in FIG. 10. When the user wants to restore a template (i.e., when the user wants to upload a template), the user clicks the restore link with the mouse. Clicking activates a template restore window shown in FIG. 12.

Figure 10:
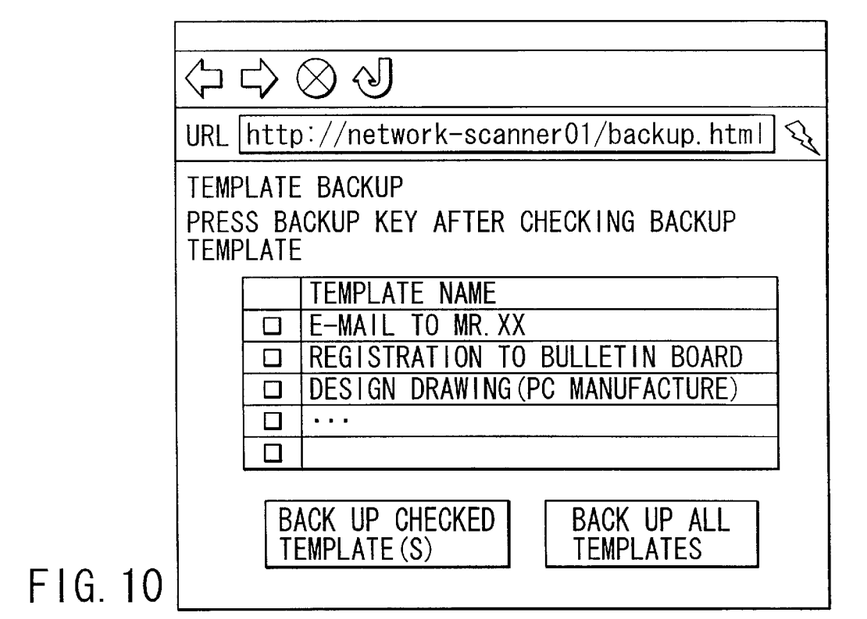
FIG. 10 is a view showing a template list window for backup candidates.

FIG. 10 is a view showing the template list window for backup candidates. A list of templates in the HTML form output from the template storage unit 104 is displayed in the template list window for backup candidates. The user selects (checks) a template to be backed up from the template list window for backup candidates. That is, the user clicks the item "backup of a checked template" or "backup of all templates". This clicking activates the backup file creation CGI (see FIG. 11).

When the backup file creation CGI is activated, the template designated from the template list window for the backup candidates is received from the template storage unit 104 as an argument of the CGI. In addition, the data of the template is read out from the template storage unit 104, and a backup file is created in the backup file buffer area. The date and time data are contained in the file name of the template. This allows the user to easily manage the backup file.

Figure 11:
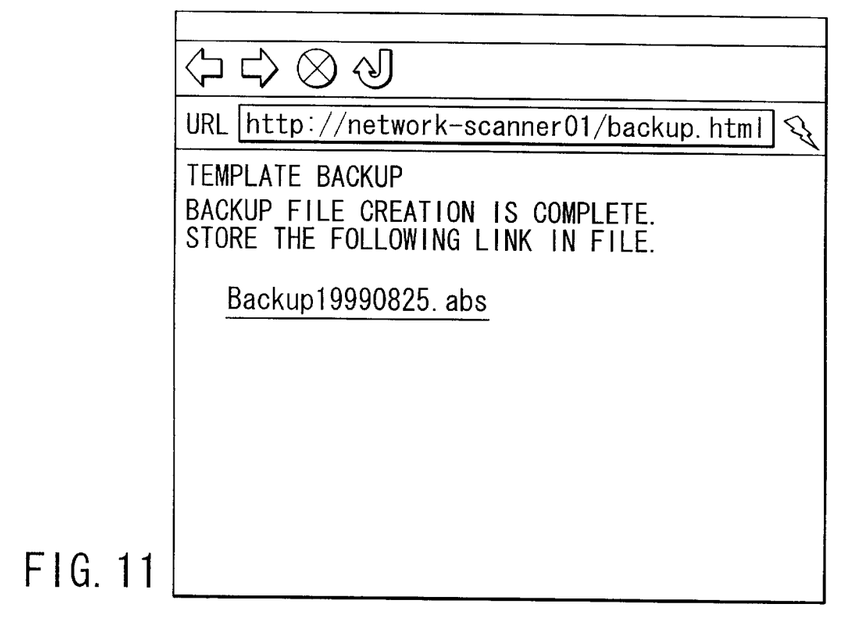
FIG. 11 is a view showing a template backup window.

In order to download a backup template file, a template backup window shown in FIG. 11 is displayed. A link associated to the backup file in the backup file buffer area is displayed in the template backup window. The user stores the link of the backup as a basic operation of the browser in the file, thereby acquiring a backup file of the template. The download of the template is thus completed.

Figure 12:
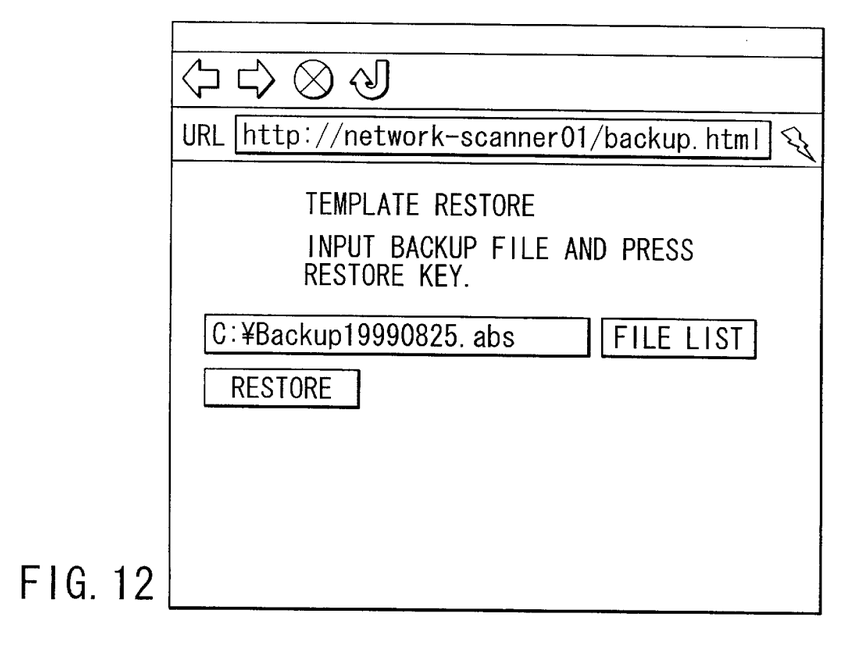
FIG. 12 is a view showing a template restore window.

FIG. 12 is a view showing a template restore window. The user inputs a backup file name in the file name text box in the template restore window. The user may click the item "file list" at the right in the template restore window to display a file selection dialog and may select a backup file. When the user then clicks the item "restore", the backup file is transferred to the network scanner (digital copying machine 10) (The Web server stores the file in the backup file buffer area). When the transfer of the backup file is complete, the backup file analysis CGI is activated to display a template restore list window shown in FIG. 13.

When the backup file analysis CGI is activated, the transferred backup file is read out, and the backup date and time at which the file was stored in the backup file in file creation, the name (identification data) of the network scanner which created the backup file, and the like are extracted from the transferred backup file and displayed. In addition, the template list stored in the backup file is also displayed in the template restore window shown in FIG. 13.

Figure 13:
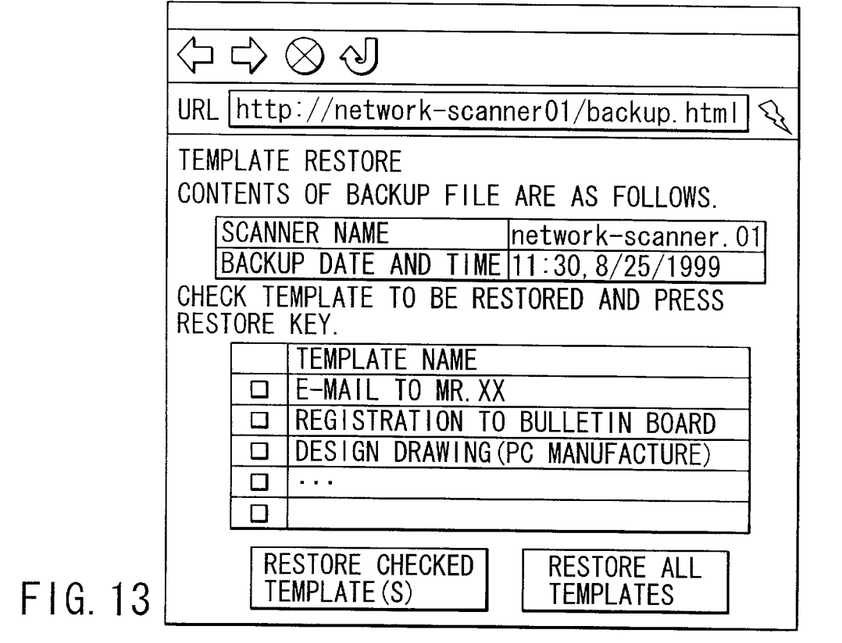
FIG. 13 is a view showing a template restore list window.

When the template restore list window is displayed, the user checks the backup date and time and the network scanner name and selects a template to be restored. When the user clicks the item "restore the checked template(s)" or "restore all templates". This clicking activates the restore CGI module to display a "complete" window shown in FIG. 14.

Figure 14:
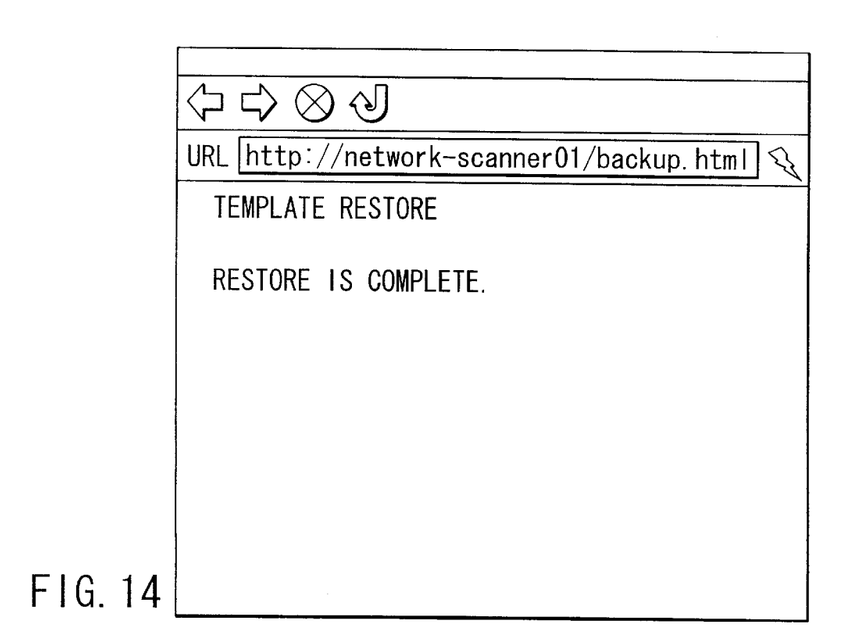
FIG. 14 is a view showing a window for notifying the user of the end of template restore operation.

The restore CGI receives as an argument a template designated from the template restore list window shown in FIG. 13, reads out the designated template from the backup file, updates the template in the template storage unit 104, and displays the "complete" window shown in FIG. 14. The restore operation is thus completed.

A backup file format is shown below.

```
<Baclup>
<ScannerName>NetworkScanner01</ScannerName>
<BackupDate>1999/08/25 13:20:13(JST-9)</BackupDate>
<ScanTemplate ID = "1">
<Name>E-mail to Mr. XX</Name>
<Resolution>600</Resolution>
<ImageMode>Character</ImageMode>
<Density>Auto</Density>
<Distributor>E-Mail</Distributor>
<Address>XX@yy.co.jp</Address>
</Setting>
<ScanTemplate ID = "2">
<Name>registration to bulletin board</Name>
<Resolution>600</Resolution>
<ImageMode>Character</ImageMode>
<Density>Auto</Density>
<Distributor>GroupWare</Distributor>
<Address>category : bulletin board</Address>
</Setting>
<ScanTemplate ID = "3">
<Name>drawing management (PC manufacture)</Name>
<Resolution>600</Resolution>
<ImageMode>Character</ImageMode>
<Density>Auto</Density>
<Distributor>FileServer</Distributor>
<Address>\\Server\FIG\PC</Address>
</ScamTemplate>
<Backup>
```

As described above, a backup file is created in the XML format, which facilitates generating an offline edit tool. Note that the backup file format is not limited to this.

Figure 15:
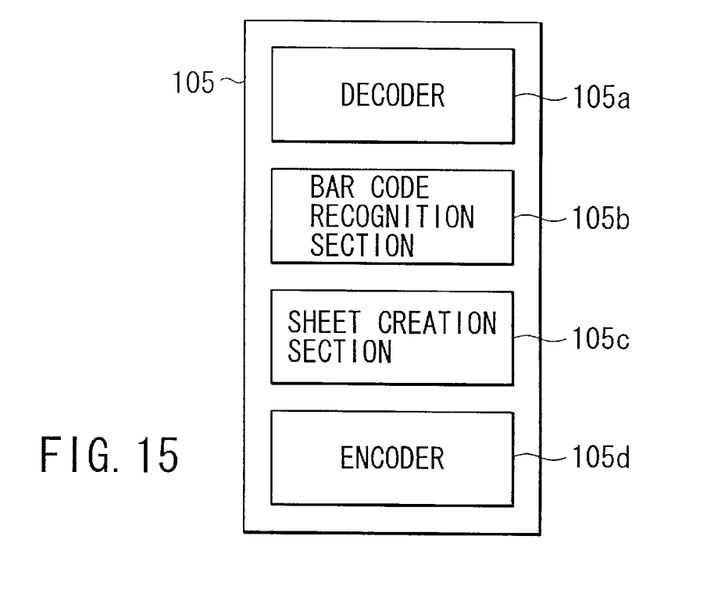
FIG. 15 is a view for explaining bar code processing by the template management unit.

FIG. 15 is a view showing the schematic arrangement of the template management unit 105. The template management unit 105 is comprised of a decoder 105a, bar code recognition section 105b, sheet creation section 105c, and encoder 105d.

The encoder 105d encodes all data on a template. The sheet creation section 105c creates printing data such as a bar code from the encoded template. The printing data (bar code) created by the sheet creation section 105c is printed out at the printer 102. The printed bar code sheet is read by the image reader 101. The bar code recognition section 105b recognizes the bar code read by the image reader 101. The decoder 105a decodes the template from the recognized bar code.

More specifically, the template management unit converts the template setting data into OMR data using the bar code. As OMR data, a simple one-dimensional bar code and a two-dimensional bar code are available. Alternatively, upon encoding the data, the encoded data may be printed with OCR fonts, the printed data may be recognized with an OCR, and the recognized data may be decoded.

To print out a target template on a paper sheet, the user selects this template from the template list window shown in FIG. 4 and touches the backup key.

The template is printed out in procedures (1) to (4) below.

Figure 16:
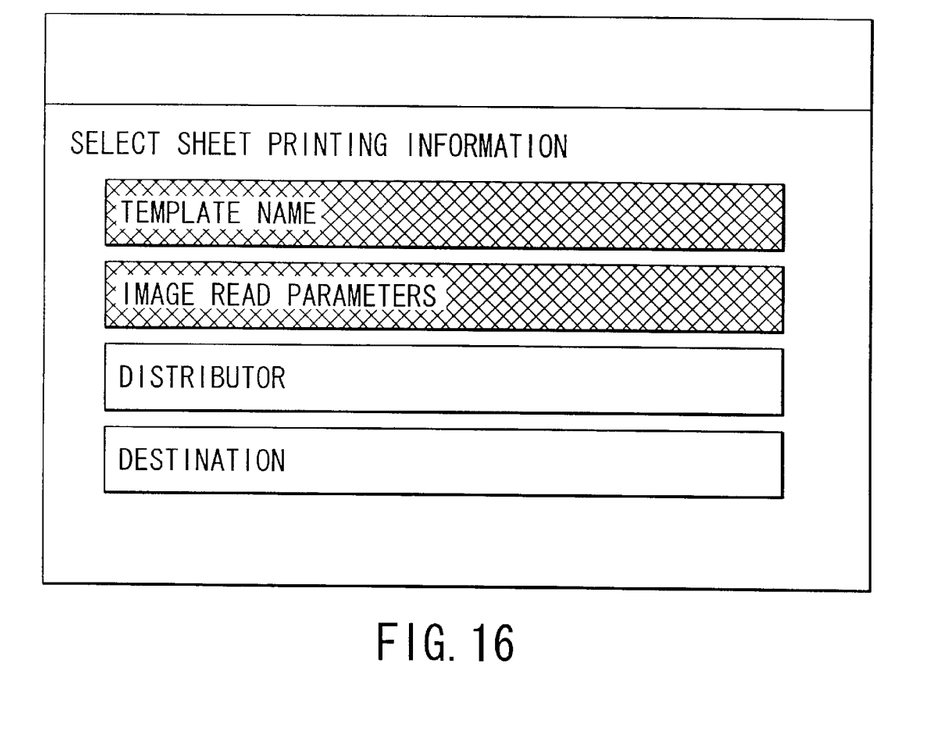
FIG. 16 is a view showing a sheet printing information selection window.

(1) The user designates the item of the target template via a sheet printing information selection window shown in FIG. 16.

(2) The encoder 105a encodes the template data.

(3) The sheet creation section 105c creates printing data from the encoded template data.

(4) The printer 102 prints out printing data.

FIG. 17 is a view showing a printed template setting sheet. To decode the template by reading this template setting sheet, the user sets the template setting sheet on the image reader 101 and touches the item "template read" in the initial window shown in FIG. 2.

The template setting sheet is restored by procedures (1) to (4) as follows.

(1) The user touches the item "template read".

(2) The image reader 101 reads the template setting sheet.

(3) The bar code recognition section 105b recognizes the bar code contained in the image data read by the image reader 101.

(4) The decoder 105a decodes and restores the recognized bar code into the template.

Operation for printing a template setting sheet including an outline of a template will be described below. An outline of a template represents the template contents in characters or the like so that the user can check the contents of the template. In this case, the user touches the backup key in the template list window shown in FIG. 4. At this time, a sheet printing information selection window shown in FIG. 16 is displayed. In the sheet printing information selection window, the template name and image read parameters are so set as to be printed out as an outline of the template. When execution is instructed from this window, the template setting sheet including an outline of the template is printed out. FIG. 17 shows this template setting sheet.

As has been described above, the present invention provides the following functions and effects.

(1) Since a series of parameters are stored as one template, operation of setting the same parameters again from the beginning can be omitted.

(2) A template stored in the digital copying machine can be downloaded to a terminal and backed up in it. This can prevent any loss of template data.

(3) Template data downloaded to and backed up in the terminal can be uploaded to the digital copying machine. This facilitates restoring the template data in the digital copying machine.

(4) A template stored in the digital copying machine can be encoded into a bar code, and the bar code can be printed out. This prevents any loss of the template data.

(5) The printed bar code can be read to allow decoding the corresponding template. This allows the digital copying machine to easily restore the template data from the printed bar code.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading system comprising an image reading device and a terminal device which are connected via a network, said image reading device comprising:
a setting unit for setting parameters including a destination,
a first storage unit for storing a series of parameters set by said setting unit as one template,
an image reader for reading an image on the basis of the parameters set in the template, and
a transfer unit for initiating transfer of image data read by the image reader, based on said destination included in the parameters set in the template,
and wherein said terminal device comprises a second storage unit for storing the template stored in said first storage unit.

2. A system according to claim 1, wherein said terminal device comprises a communication unit for downloading via said network the template stored in said first storage unit.

3. A system according to claim 1, wherein said terminal device comprises a communication unit for uploading to said image reading device via said network the template stored in said second storage unit.

4. A system according to claim 1, wherein said terminal device comprises a communication unit for selecting a predetermined template from a plurality of templates stored in said first storage unit and downloading the predetermined template via said network.

5. A system according to claim 1, wherein said terminal device comprises a communication unit for selecting a predetermined template from a plurality of templates stored in said second storage unit and uploading the predetermined template to said image reading device via said network.

6. A system according to claim 1, wherein said image reading device comprises a template management unit for adding identification data of said image reading device to the template and managing the resultant template.

7. An image reading system comprising:
a setting unit for setting parameters including a destination;
a storage unit for storing a series of parameters set by said setting unit as one template;
an image reader for reading an image on the basis of parameters set in the template; and
a transfer unit for initiating transfer of image data read by the image reader, based on said destination included in the parameters set in the template.

8. A system according to claim 7, further comprising:

a conversion unit for converting the template into a bar code; and a printer for printing the bar code converted by said conversion unit.

9. A system according to claim 8, further comprising a decoder for decoding a bar code, printed at said printer and read by said image reader, into an original template.

10. A system according to claim 1, wherein said image reading device comprises an output unit for outputting template data based on the template.

11. A system according to claim 1, wherein said image reading device comprises:

a conversion unit for converting the template into a bar code; and a printer for printing the bar code converted by said conversion unit.

12. A system according to claim 11, wherein said image reading device comprises a decoder for decoding a bar code, printed at said printer and read by said image reader, into an original template.

13. A system according to claim 7, further comprising an output unit for outputting template data based on the template.

14. A system according to claim 7, wherein said image reading device comprises a template management unit for adding identification data of the system to the template and managing the resultant template.

* * * * *